(12) United States Patent
Tanaka et al.

(10) Patent No.: US 11,086,405 B2
(45) Date of Patent: Aug. 10, 2021

(54) DISPLAY DEVICE AND PROJECTION DEVICE

(71) Applicant: NIKON CORPORATION, Tokyo (JP)

(72) Inventors: Atsushi Tanaka, Fuchu (JP); Kumiko Ishida, Kawasaki (JP); Toru Miyakoshi, Kawasaki (JP); Chiori Saito, Tokyo (JP); Michiyo Ogawa, Tokyo (JP); Masakazu Sekiguchi, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 16/523,089

(22) Filed: Jul. 26, 2019

(65) Prior Publication Data

US 2019/0377419 A1    Dec. 12, 2019

Related U.S. Application Data

(63) Continuation of application No. 15/890,862, filed on Feb. 7, 2018, now Pat. No. 10,409,386, which is a
(Continued)

(30) Foreign Application Priority Data

Dec. 28, 2011 (JP) ................................ 2011-289255
Dec. 28, 2011 (JP) ................................ 2011-289291

(51) Int. Cl.
*G06F 3/01* (2006.01)
*G06F 3/042* (2006.01)
(Continued)

(52) U.S. Cl.
CPC .............. *G06F 3/017* (2013.01); *G03B 21/14* (2013.01); *G06F 3/0421* (2013.01); *G06F 3/0425* (2013.01); *G08C 17/00* (2013.01); *G09G 3/002* (2013.01); *H04Q 9/00* (2013.01); *G09G 2340/14* (2013.01); *G09G 2354/00* (2013.01); *H04Q 2209/84* (2013.01)

(58) Field of Classification Search
CPC ....... G03B 21/14; H04N 5/7458; F21S 48/14; G06F 3/0421
USPC ........ 345/156, 175; 715/700, 716, 717, 730, 715/863, 810
See application file for complete search history.

(56) References Cited

U.S. PATENT DOCUMENTS 6,002,505 A    12/1999   Kraenert et al.
6,600,500 B1    7/2003   Yamamoto
(Continued)

FOREIGN PATENT DOCUMENTS

CN    1209935 A    3/1999
CN    1460918 A    12/2003
(Continued)

OTHER PUBLICATIONS

May 12, 2015 Office Action issued in Japanese Patent Application No. 2011-289291.
(Continued)

*Primary Examiner* — William C. Dowling
(74) *Attorney, Agent, or Firm* — Oliff PLC

(57) ABSTRACT

Provided is a convenient display device including: a display unit capable of projecting a projection image on a domain in accordance with a position of a user; and a judgment unit that judges whether the projection image can be projected on the domain.

15 Claims, 10 Drawing Sheets

Related U.S. Application Data continuation of application No. 14/367,163, filed as application No. PCT/JP2012/076468 on Oct. 12, 2012, now Pat. No. 9,927,878.

(51) Int. Cl.
*G09G 3/00* (2006.01)
*G08C 17/00* (2006.01)
*H04Q 9/00* (2006.01)
*G03B 21/14* (2006.01)

(56) References Cited

U.S. PATENT DOCUMENTS

| | | | |
|---|---|---|---|
| 8,231,225 | B2 | 7/2012 | LaDuke et al. |
| 8,887,043 | B1 | 11/2014 | Pollack et al. |
| 9,041,691 | B1 | 5/2015 | Haskin et al. |
| 2004/0021799 | A1 | 2/2004 | Matsuda |
| 2007/0013716 | A1 | 1/2007 | Kjeldsen et al. |
| 2007/0118638 | A1 | 5/2007 | Ban et al. |
| 2009/0027337 | A1 | 1/2009 | Hildreth |
| 2009/0027571 | A1 | 1/2009 | Amano |
| 2009/0031240 | A1 | 1/2009 | Hildreth |
| 2010/0026624 | A1 | 2/2010 | Bell |
| 2010/0259473 | A1 | 10/2010 | Sakata et al. |
| 2010/0269072 | A1 | 10/2010 | Sakata et al. |
| 2011/0032488 | A1 | 2/2011 | Abe et al. |
| 2011/0221768 | A1 | 9/2011 | Hasegawa |
| 2011/0291990 | A1 | 12/2011 | Kiyose et al. |
| 2012/0050273 | A1 | 3/2012 | Yoo et al. |
| 2013/0321346 | A1 | 12/2013 | Tyler et al. |
| 2014/0118705 | A1 | 5/2014 | Hasegawa et al. |
| 2014/0139426 | A1 | 5/2014 | Kryze et al. |
| 2014/0225824 | A1 | 8/2014 | Shpunt et al. |
| 2014/0327610 | A1 | 11/2014 | Athavale et al. |
| 2015/0237704 | A1 | 8/2015 | Siegel |

FOREIGN PATENT DOCUMENTS

| | | |
|---|---|---|
| CN | 101874234 A | 10/2010 |
| CN | 101986193 A | 3/2011 |
| JP | H05-046310 A | 2/1993 |
| JP | H10-69366 A | 3/1998 |
| JP | 2000-330684 A | 11/2000 |
| JP | 2004-302124 A | 10/2004 |
| JP | 2004-320209 A | 11/2004 |
| JP | 2005-215726 A | 8/2005 |
| JP | 2006-121231 A | 5/2006 |
| JP | 2006-314531 A | 11/2006 |
| JP | 2006-331092 A | 12/2006 |
| JP | 2007-235470 A | 9/2007 |
| JP | 2009-223490 A | 10/2009 |
| JP | 2010-217645 A | 9/2010 |
| JP | 2010-534895 A | 11/2010 |
| JP | 2011-009066 A | 1/2011 |
| JP | 2011-120098 A | 6/2011 |
| JP | 2011-186892 A | 9/2011 |
| JP | 2011-209579 A | 10/2011 |
| JP | 2011-242416 A | 12/2011 |
| JP | 2011-242699 A | 12/2011 |
| WO | 2004/107071 A1 | 12/2004 |
| WO | 2010/035477 A1 | 4/2010 |

OTHER PUBLICATIONS

Aug. 4, 2015 Office Action issued in Chinese Patent Application No. 201280070259.2.
Oct. 6, 2015 Office Action issued in Japanese Patent Application No. 2011-289291.
Jun. 6, 2016 Office Action issued in Chinese Patent Application No. 201280070259.2.
Jun. 14, 2016 Decision of Refusal in Japanese Patent Application No. 2011-289291.
Oct. 4, 2016 Office Action issued in Japanese Patent Application No. 2012-267843.
Jan. 6, 2017 Office Action issued in U.S. Appl. No. 14/367,163.
May 16, 2017 Office Action issued in Japanese Patent Application No. 2012-267843.
Jan. 8, 2013 International Search Report issued in International Patent Application No. PCT/JP2012/076468.
Nov. 8, 2017 Notice of Allowance issued in U.S. Appl. No. 14/367,163.
Feb. 28, 2018 Notice of Allowance issued in U.S. Appl. No. 14/367,163.
Jun. 26, 2018 Office Action issued in Japanese Patent Application No. 2017-157198.
Oct. 11, 2018 First Examination Report issued in Indian Patent Application No. 5134/DELNP/2014.
Mar. 19, 2019 Office Action issued in Japanese Patent Application No. 2017-157198.
Jun. 20, 2018 Office Action issued in U.S. Appl. No. 15/890,862.
Apr. 26, 2019 Notice of Allowance issued in U.S. Appl. No. 15/890,862.
Jan. 10, 2020 Office Action issued in Chinese Patent Application No. 201710930574.2.
Jul. 24, 2020 Office Action issued in Chinese Patent Application No. 201710930574.2.
Oct. 27, 2020 Office Action issued in Chinese Patent Application No. 201710930574.2.

DISPLAY DEVICE AND PROJECTION DEVICE

This application is a continuation of U.S. patent application Ser. No. 15/890,862 filed Feb. 7, 2018, which is a continuation application of U.S. patent application Ser. No. 14/367,163 filed Jun. 19, 2014, which is a U.S. National Stage application of International Application No. PCT/JP2012/076468 filed on Oct. 12, 2012, which claims the benefit of Japanese Patent Application No. 2011-289255 filed Dec. 28, 2011 and Japanese Patent Application No. 2011-289291 filed Dec. 28, 2011. The disclosure of the prior applications is hereby incorporated by reference herein in their entirety.

TECHNICAL FIELD

The present invention relates to a display device and a projection device.

BACKGROUND ART

Conventionally, in order to operate an apparatus such as lighting equipment, there has been suggested projecting a virtual remote controller on a position where the hands and the feet of a user reach, and controlling the lighting equipment in accordance with user's operation (by a trigger finger or the like) against virtual keys of the projected virtual remote controller (e.g. Patent Document 1).

PRIOR ART DOCUMENTS

Patent Documents

Patent Document 1: Japanese Laid-open Patent Publication No. 2011-9066

SUMMARY OF THE INVENTION

Problems to be Solved by the Invention

However, the conventional proposal merely projected the virtual remote controller on the position where the hands and the feet of the user reach, and was not necessarily user-friendly.

The present invention has been made in view of the above problem, and aims to provide a display device and a projection device which are easy to use.

Means for Solving the Problems

A display device of the present invention includes: a display that performs a display on a domain in accordance with a position of a user; and a judger that judges whether the display to the domain is possible.

In this case, the judger may judge whether the display to the domain is possible, based on a detection result of a thermal sensor that detects a physical quantity about a heat of the domain. Moreover, the judger may judge whether the display is possible, based on a detection result of a distance sensor that detects a level difference in the domain. Moreover, the display device includes a dangerous object detector that detects existence or nonexistence of a dangerous object, based on an image capturing result of an image capture unit that captures the domain, and the judger may judge whether the display is possible, based on a detection result of the dangerous object detector.

The display device of the present invention may include an adjuster that adjusts the display by the display, based on an image capturing result of an image capture that captures the domain. In this case, the adjuster can adjust at least one of a size, a position and a luminance of the display. Moreover, the adjuster can adjust the size of the display in accordance with a number of persons captured by the image unit. Moreover, the adjuster can adjust the position of the display in accordance with a direction of a person captured by the image capture.

In addition, in the display device of the present invention, the display can display an operation menu image of a plurality of electronic apparatuses on the domain. In this case, the display device may include a controller that causes the display unit to display the operation menu image on which the layout of the electronic apparatuses is reflected, on the domain. In this case, the display device includes a communicator that is communicatable with the electronic apparatuses, and the controller may detect the layout of the electronic apparatuses in accordance with a communication state, and cause the display to display an operation menu on which the layout is reflected.

In addition, a projection device of the present invention includes: an image capture capable of capturing a user; a projector capable of projecting a projection image on a domain in accordance with a position of the user, and a judger that judges whether the image capture is capable of capturing the projection image projected by the projector.

In this case, the projection device may include an object detection sensor that detects whether there is an object in a space including the image capture and the domain, the object interrupting image capturing by the image capture. In this case, the object detection sensor may include a distance sensor. In this case, the object detection sensor may include an image sensor. Moreover, the projection device may include an adjuster that adjust a position where the projection image is projected, when the image capture fails to capture at least a part of the projection image projected by the projector.

In addition, the projection device may include an actuator that drives the image capture when the image capture fails to capture at least a part of the projection image projected by the projector. In addition, the image capture is capable of capturing the user and a structure, and the judger may judge a direction of the user based on the image capturing result of the structure. Moreover, the image capture may be arranged so as to capture the user from above the user. In this case, the judger may judge a posture of the user based on the image capturing result of the image capture.

A display device of the present invention includes: a detector that detects a posture of a user from an image capturing result of an image capture that captures the user from above; and a display that performs a display near the user in accordance with the posture of the user.

In this case, the detector can detect the posture of the user by detecting a size of the user from the image capturing result of the image capture.

A display device of the present invention includes: a detector that detects a position of a user, and a display that displays a menu about the operation of a plurality of electronic apparatuses in accordance with a detection result of the detector.

In this case, the display device may include a controller that causes the display to display the menu in accordance with the layout of the electronic apparatuses. Moreover, the menu includes hierarchical menus in accordance with each of the electronic apparatuses, and the controller may make at least a part of the display of the hierarchical menus in common.

A display device of the present invention includes: an image capture capable of capturing a user which uses a first apparatus; and a display that displays information on a second apparatus different from the first apparatus, based on an image capturing result of the image capture.

In this case, the display device includes a voice detector that detects information on a voice of the user which uses the first apparatus, and the display may project the information on the second apparatus, based on a detection result of the voice detector. In addition, the voice detector may detect information on diction in the voice. In addition, the image capture may capture a hand or foot of the user against the information on the second apparatus displayed by the display. In this case, the display device may include a communicator that communicates with the second apparatus based on the image capturing result of the image capture. In addition, the display displays the information on the second apparatus, and when the communicator does not communicate with the second apparatus for a given period, the display may terminate the display of the information on the second apparatus.

Also in the display device of the present invention, the image capture captures a face of the user, and the display may display the information on the second apparatus based on the image capturing result of the face. The display device includes a measurer that measures a period when the user uses the first apparatus, and the display may display the information on the second apparatus based on a measurement result of the measurer. In addition, the display may display the information on the first apparatus in addition to the information on the second apparatus. The display device may include a detector that detects an apparatus being driven when the first apparatus is used. Moreover, the voice detector detects information on the contents of conversation of the user which uses the first apparatus, and the display may display information in accordance with the information on the contents of conversation.

The display device of the present invention includes: a detector that detects a state of a user which uses a first apparatus; and a display that displays information on a second apparatus different from the first apparatus in accordance with a detection result of the detector.

Effects of the Invention

The present invention can provide a display device and a projection device that are easy to use.

MODES FOR CARRYING OUT THE INVENTION

First Embodiment

Figure 1:
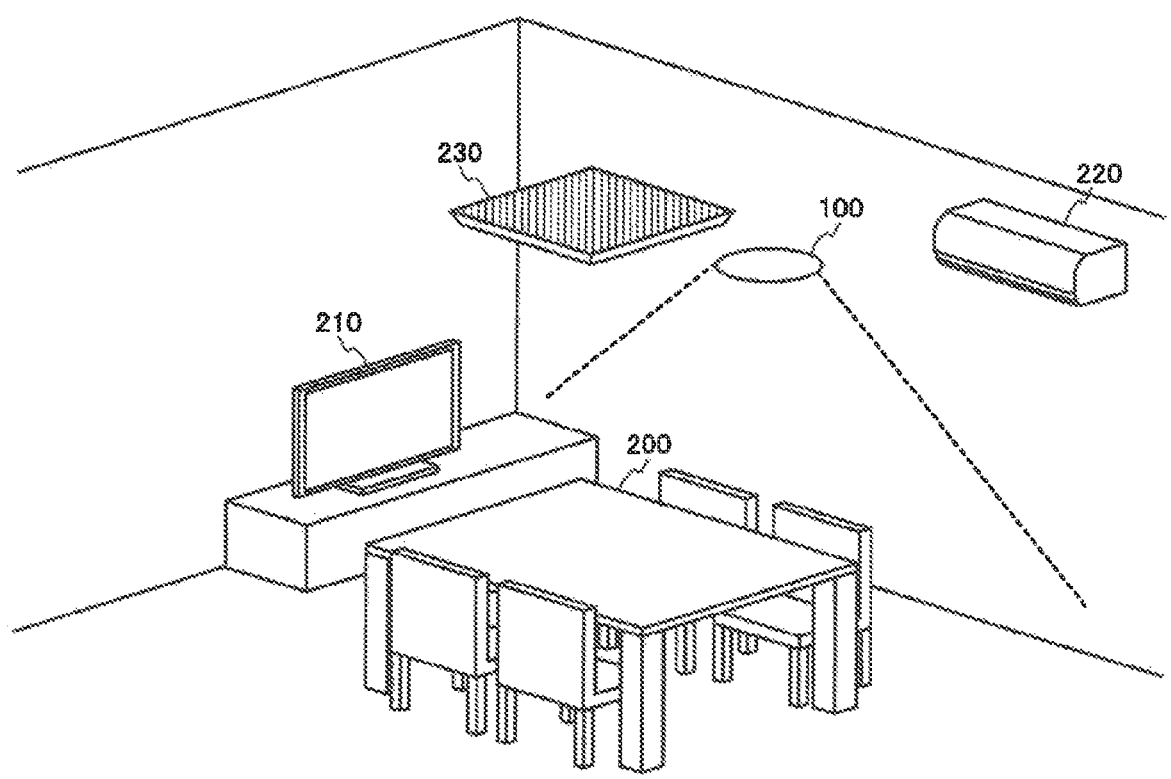
FIG. 1 is a diagram schematically illustrating a state of a living in which a projection/apparatus control system according to a first embodiment is placed.

Hereinafter, a detailed description will be given of a first embodiment based on FIGS. 1 to 6. FIG. 1 is a diagram schematically illustrating the composition of a projection/apparatus control system 100 according to a first embodiment.

The projection/apparatus control system 100 is provided on a ceiling of a living, and projects an operation menu image for operating an electronic apparatus 80 such as a television 210, an air conditioner 220 and an illumination apparatus 230, onto an upper surface of a table 200 and a floor, as illustrated in FIG. 1. Also, when there is operation (gesture) by a user for the operation menu image, the projection/apparatus control system 100 performs the control of the electronic apparatus 80 in accordance with the operation.

Figure 2:
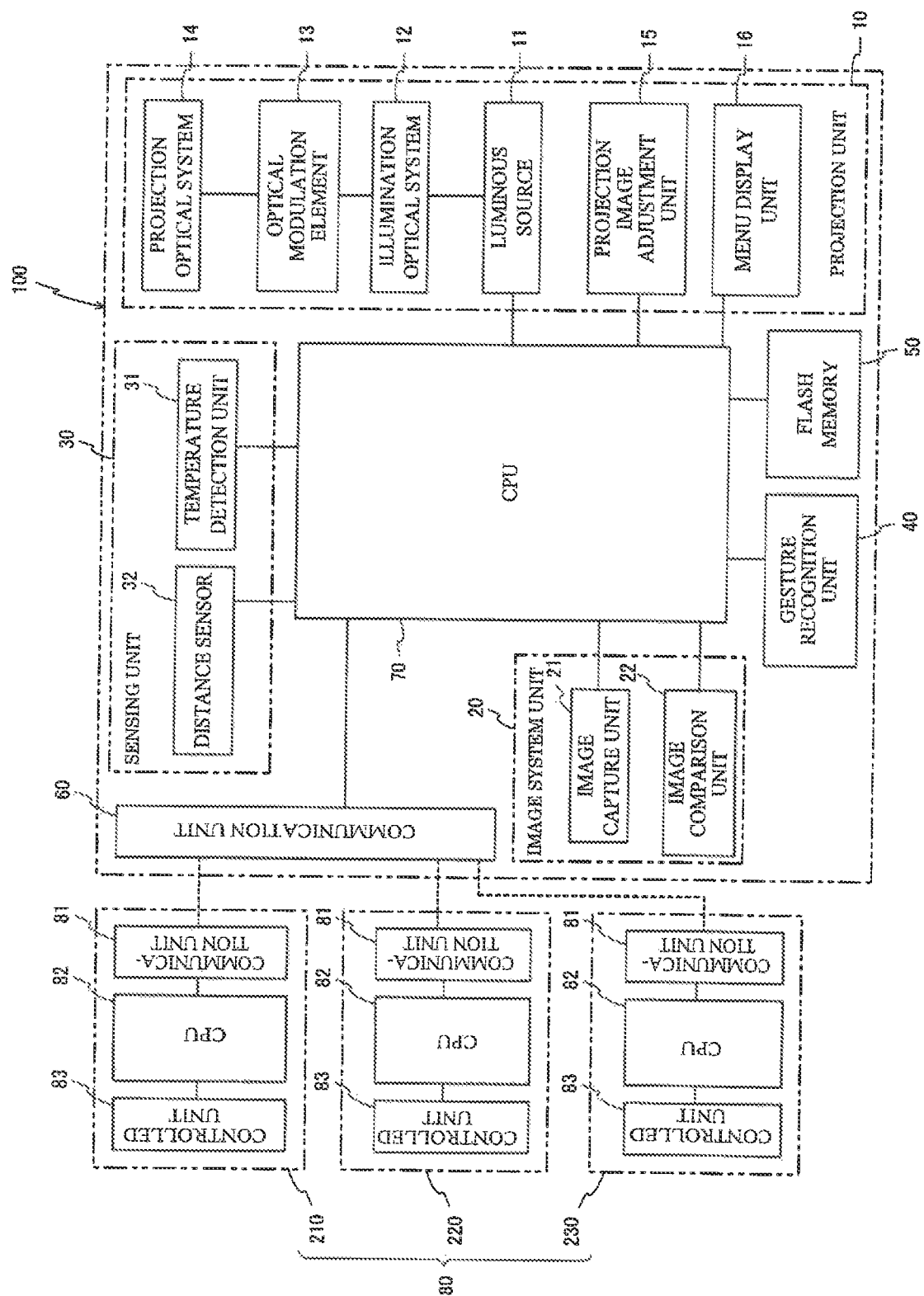
FIG. 2 is a block diagram illustrating the projection/apparatus control system according to the first embodiment, and an electronic apparatus.

FIG. 2 is a block diagram illustrating the projection/apparatus control system 100. The projection/apparatus control system 100 includes a projection unit 10, an image system unit 20, a sensing unit 30, a gesture recognition unit 40, a flash memory 50, a communication unit 60 and a CPU 70. Hereinafter, a detailed description will be given of each unit.

(Projection Unit 10) The projection unit 10 includes a luminous source 11, an illumination optical system 12, an optical modulation element 13, a projection optical system 14, a projection image adjustment unit 15 and a menu display unit 16. Here, the number of the projection units 10 to be placed can be determined according to the width and the layout of the living.

The luminous source 11 is a lamp which emits light, for example. The illumination optical system 12 illuminates a beam of light emitted from the luminous source 11 to the optical modulation element 13. The optical modulation element 13 is a liquid crystal panel, for example, and generates an image (an image on the basis of image data inputted from the menu display unit 16 as described later) projected on the upper surface of the table 200 and so on. The projection optical system 14 is an optical system which projects the beam of light from the optical modulation element 13 on the upper surface of the table 200 and the floor, and includes a zoom lens that adjusts the size of an image to be projected and a focus lens which adjusts a focus position. Here, the positions of lenses included in the zoom lens and the focus lens are adjusted by actuators, not shown.

The projection image adjustment unit 15 determines a region (size) of the image to be projected on the upper surface of the table 200 and the floor, and a distance, based on an image capturing result of the image system unit 20 and a detection result of the sensing unit 30. The projection image adjustment unit 15 controls the actuators, not shown, in accordance with the determined region (size) of the image and the determined distance, and adjusts the positions of the lenses included in the zoom lens and the focus lens. Also, the projection image adjustment unit 15 performs a contrast process, adjusts (changes) a color of the menu to be projected, and adjusts a luminance of the luminous source 11, in accordance with the color and the brightness of the upper surface of the table 200 and the floor. The projection image adjustment unit 15 also performs setting about the content (arrangement of icons, or the like) of the image to be displayed.

The menu display unit 16 displays the operation menu image for operating the electronic apparatus 80 on the upper surface of the table 200 and the floor via the projection optical system 14, based on the image capturing result of the image system unit 20 and the detection result of the sensing unit 30.

FIGS. 3A to 3D illustrate examples of an operation menu image 17 which the menu display unit 16 displays via the projection optical system 14. The operation menu image 17 which the menu display unit 16 displays has a layered structure (a structure in which the images of FIGS. 3A to 3D are displayed in accordance with the operation).

Figure 3A:
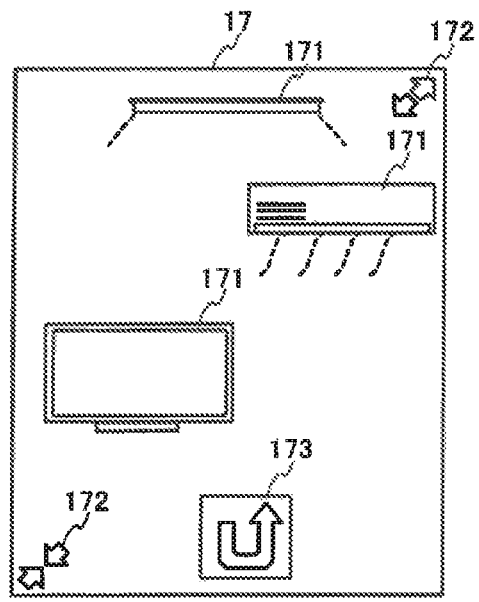
FIGS. 3A to 3D are diagrams illustrating examples of operation menu images according to the first embodiment.

FIG. 3A is an initial menu image (an operation menu image to be projected initially). Icons 171 for selecting the electronic apparatus 80 to be operated, icons 172 for magnifying and reducing the image, an icon 173 for finishing the projection (this means "return") are included in the initial menu image of FIG. 3A. In FIG. 3A, the icons of the illumination apparatus, the air conditioner, the television corresponding to apparatuses arranged in the living of FIG. 1 are displayed as icons 171 for selecting the electronic apparatus 80. In FIG. 3A, the icons are displayed according to the layout of the room (up-and-down relationship) so that a user can select the electronic apparatus 80 intuitively. Specifically, the icon of the illumination apparatus 230 is displayed on a top position, the icon of the air conditioner 220 is displayed on a middle position, and the icon of the television 210 is displayed on a bottom position. In this case, there is a case where the position of the electronic apparatus 80 can be specified from a general layout (layout in which the illumination apparatus is placed at the top position in many cases, the air conditioner is placed below the illumination apparatus, and the television is placed near the floor), or the position of the electronic apparatus 80 cannot be specified. When the position of the electronic apparatus 80 cannot be specified, the position of the electronic apparatus 80 may be registered with the flash memory 50 in advance. Also, the position of the electronic apparatus 80 may be specified from the result of communication with the electronic apparatus 80. Here, the layout or the like of the icons is set by the CPU 70.

Figure 3B:
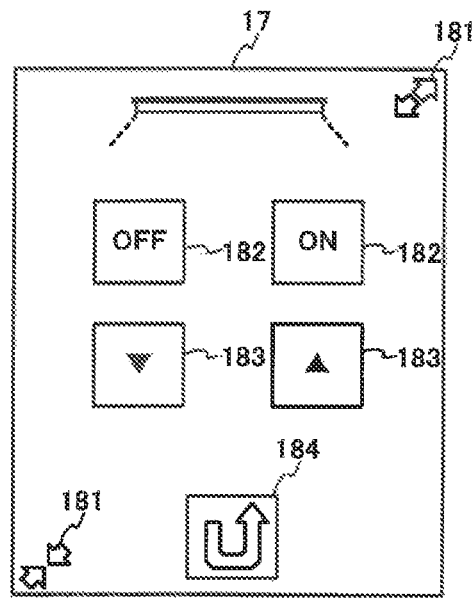

FIG. 3B is the operation menu image displayed when the icon of the illumination apparatus is selected from the initial menu image of FIG. 3A. The display of the illumination apparatus, icons 181 of magnification and reduction, icons 182 of ON/OFF switches, icons 183 of up-and-down switches, and an icon 184 indicating the return are included in the operation menu image of FIG. 3B. Here, the icons 183 of the up-and-down switches are icons for adjusting an illuminance of the illumination apparatus 230.

Figure 3C:
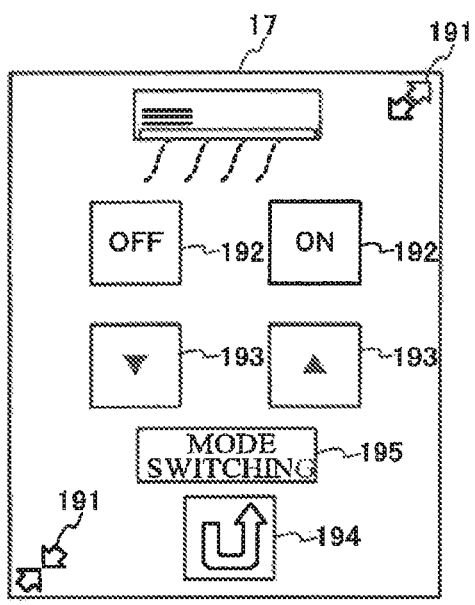

FIG. 3C is the operation menu image displayed when the icon of the air conditioner is selected from the initial menu image of FIG. 3A. The display of the air conditioner, icons 191 of magnification and reduction, icons 192 of ON/OFF switches, icons 193 of up-and-down switches, an icon 194 indicating the return, and an icon 195 indicating mode switching (cooling, heating, dehumidification, or the like) are included in the operation menu image of FIG. 3C. Here, the icons 193 of the up-and-down switches are icons for performing adjustment (change of a preset temperature, a preset humidity or the like) in accordance with a set mode.

Figure 3D:
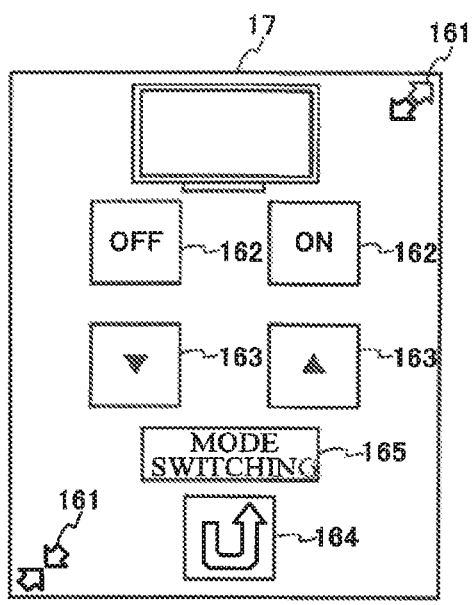

FIG. 3D is the operation menu image displayed when the television is selected from the initial menu image of FIG. 3A. The display of the television, icons 161 of magnification and reduction, icons 162 of ON/OFF switches, icons 163 of up-and-down switches, an icon 164 indicating the return, and an icon 165 indicating mode switching (channel, volume, or the like) are included in the operation menu image of FIG. 3D. Here, the icons 163 of the up-and-down switches are icons for performing adjustment (change of the channel, volume setting or the like) in accordance with a set mode.

As illustrated in FIGS. 3B to 3D, parts (for example, the icons of magnification and reduction, the icons of ON/OFF switches, the icons of up-and-down switches, and the icon indicating the return) of the operation menu image of each electronic apparatus 80 which the menu display unit 16 displays are common. Thereby, the user can operate the operation menu image comfortable even when the types of selected electronic apparatus 80 differ from each other.

(Image System Unit 20) Referring to FIG. 2, the image system unit 20 recognizes whether the user in the living requires the projection of the operation menu image, captures the inside of living and determines a place where the operation menu image 17 is projected, in advance of the projection of the operation menu image 17 by the projection unit 10. The image system unit 20 includes an image capture unit 21 and an image comparison unit 22, as illustrated in FIG. 2.

The image capture unit 21 includes a photographing lens and an imaging element, and captures a structure and the user in the living from the ceiling of the living. A wide-angle lens (for example, a wide-angle lens which can capture the whole living) in accordance with the size of the living may be used as the photographing lens. Here, the number of image capture units 21 is not limited to one, and there may be the image capture unit(s) 21 of the number (plural number) depending on the size of the living. The inside of living may be captured by driving the image capture unit 21 in two dimensions by an actuator, not shown. A CCD (Charge Coupled Device) and a CMOS (Complementary Metal Oxide Semiconductor) can be employed as the imaging element. The imaging element has a color filter in which three primary colors of RGB are Bayer-arranged, and can obtain a color signal corresponding to each color. Here, the image captured by the image system unit 20 may be a still image, a moving image, or their combination.

The image capture unit 21 may be integrally formed with the projection unit 10, or may be independently formed. In each case, the mechanical position relationship of the image capture unit 21 and the projection unit 10 should be known, and the position relationship should be stored in the flash memory 50 as a system constant.

Figure 4A:
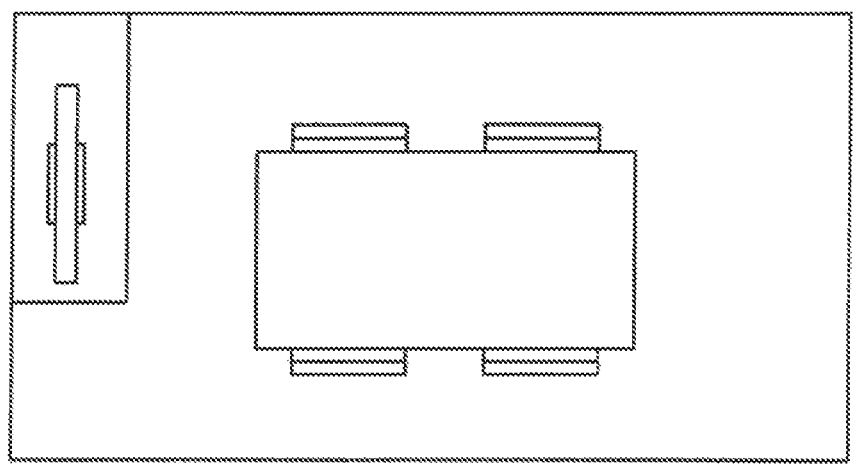
FIG. 4A is a diagram illustrating an example of a reference image.
Figure 4B:
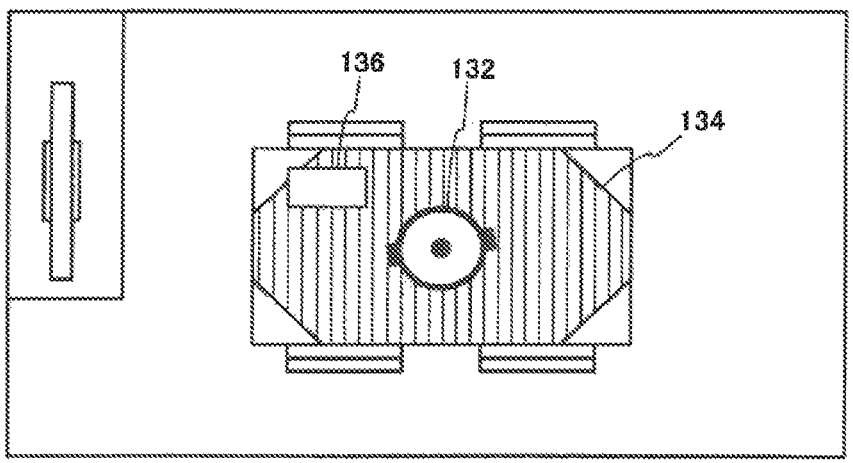
FIG. 4B is a diagram illustrating an example of an image captured by an image capture unit.

The image comparison unit 22 compares the image captured by the image capture unit 21 (see FIG. 4B) with a reference image of the living (see FIG. 4A). The reference image of the living is an image stored in the flash memory 50, and an image in which the whole inside of the living is captured. Here, the reference image may be changed in accordance with the change of the layout and seasonal remodeling. In this case, the reference image may be changed under a user's instruction. When the seasonal change is detected based on the setting change of the air conditioner (switching between the heating and the cooling), for example, the reference image may be updated automatically. Here, it is assumed that various images of dangerous objects (a cutter, a kitchen knife, a pot, a kettle, and so on) are also stored in the flash memory 50.

The image comparison unit 22 compares the image captured by the image capture unit 21 with the reference image, and determines whether the image captured by the image capture unit 21 is the same as the reference image. Moreover, the image comparison unit 22 compares the image captured by the image capture unit 21 with the various images of the dangerous objects, and determines whether an image of the dangerous object is included in the captured image and determines where the dangerous object is.

Here, when the projection unit 10 projects the operation menu image 17 based on a user's position which the image capture unit 21 has captured, a place to be projected differs by whether the user stands or sits down, and should be made the floor or the table. In order to deal with such a case, the CPU 70 may judge whether the user stands or sits down, based on the size of the head in the captured image (it changes according to a distance between the image capture unit 21 and a user's head), as described in Japanese Patent Application Publication No. 2011-141730. Specifically, when the user stands, the distance between the image capture unit 21 and the user's head shortens, and hence the user's head is captured greatly. On the contrary, when the user sits down, the distance between the image capture unit 21 and the user's head lengthens compared with the case of standing, and hence the user's head is captured small. Therefore, the CPU 70 judges a user's posture according to the size of the head captured by the image capture unit 21, and the projection unit 10 may project the operation menu image 17 on either the floor or the table, based on the judgment result. Here, information on a user's height, the size of the head, or the like, is stored in the flash memory 50, and the CPU 70 may judge whether the user stands or sits down by using these information. Moreover, the CPU 70 may judge whether the user stands or sits down based on the shoulder width of the user in the captured image, instead of the size of the head.

(Sensing Unit 30) The sensing unit 30 includes a temperature (heat quantity) detection unit 31 and a distance sensor 32, as illustrated in FIG. 2.

The temperature detection unit 31 includes: an infrared sensor, an actuator that drives the infrared sensor in two dimensions in order for the infrared sensor to detect the temperature (heat quantity) at a predetermined domain in the living; and a preset temperature detection unit that detects a temperature (for example, 40 degrees or more) equal to or more than a predetermined value among temperatures which the infrared sensor detected. In the first embodiment, the temperature detection unit 31 detects the temperature equal to or more than a predetermined value in order to prevent the projection unit 10 from projecting the operation menu image 17 on a high temperature portion and its neighborhood when a high-temperature pan is placed on the table, for example.

The temperature detection unit 31 detects a surface temperature of a person, and a place where the user is present may be detected by the temperature. In this case, the projection/apparatus control system 100 may be started up from the time of having detecting that the user is in the living. Here, to perform such a start-up control, it is necessary to start (turn on) the driving of the infrared sensor according to the opening-and-closing operation of the door in the living, or to always drive the infrared sensor.

The distance sensor 32 includes an ultrasonic sensor, for example, and detects whether an object which generates a level difference, such as a small portable device and a toy, is placed on the floor or the table. In the first embodiment, the level difference is detected in order to prevent the projection unit 10 from projecting the operation menu image on a portion with the level difference.

Moreover, the image comparison unit 22 may detect the level difference by comparing the image captured by the image capture unit 21 with the reference image (an image having no level difference). Here, in the case where a table cloth on the table 200 is exchanged, even a portion having few level difference may be detected as a level difference. For this reason, in the first embodiment, the image comparison unit 22 detects the portion having a difference between the image captured by the image capture unit 21 and the reference image, and the distance sensor 32 detects whether the portion having the difference includes the level difference. Various height, such as 5 mm or more or 10 mm or more, is employable as the height of the level difference to be detected.

(Gesture Recognition Unit 40) The gesture recognition unit 40 recognizes a user's gesture in cooperation with the image capture unit 21. The gesture recognition unit 40 recognizes whether the user requires the projection of the operation menu image, and recognizes the operation state of the user on the operation menu image 17.

When the gesture recognition unit 40 acquires the image captured by the image capture unit 21 and detects the user's face in the captured image, the gesture recognition unit 40 judges that projecting the operation menu image is required. The reason why such a judgment is possible is that the image capture unit 21 can usually capture the user's head but cannot capture the face since the image capture unit 21 is provided on the ceiling as described above. Here, when the user performs the operation which points at the image capture unit 21, the gesture recognition unit 40 may recognize that the user requires the projection of an operation menu. Moreover, the gesture recognition unit 40 may recognize that the user requires the projection of an operation menu by a combination of the above-mentioned face detection and the above-mentioned pointing operation.

On the other hand, the gesture recognition unit 40 acquires the image captured by the image capture unit 21, and recognizes the user's operation on the operation menu image 17 by color recognition (skin color recognition or the like) in the captured image when a user's hand or finger is located on the operation menu image for a predetermined period (e.g. 1 to 5 seconds). After the user's hand or finger is located on the operation menu image, the moving image or sequential still images is captured, and a user's gesture may be recognized from the change (trace) of the position of the hand or finger. Here, the user's hand or finger may directly contact with the operation menu image. However, when a part of a user's body is in a projection domain of the operation menu image, it is recognized that the user is operating the operation menu image, and hence the user's hand or finger may not directly contact with the operation menu image.

Here, an image of the user's hand may be stored in the flash memory 50. The gesture recognition unit 40 may recognizes a position of the user's hand by using the image of the user's hand.

Here, the gesture recognition unit 40 may determine an operation amount of each of the icons 183, 193 and 163 of the up-and-down switches illustrated in FIGS. 3B to 3D, in accordance with a number of user's fingers on each of the icons. For example, it is assumed that the mode is a volume setting in the operation of the television illustrated in FIG. 3D. In this case, when three fingers are on the icon of an up switch, the gesture recognition unit 40 recognizes the three fingers as the operation which increases volume by three levels.

(Flash Memory 50) The flash memory 50 is a nonvolatile memory. A program which the CPU 70 performs, information on the layout of the living, a system constant of a mechanical position relationship between the image capture unit 21 and the projection unit 10, data on the reference image and various images of the dangerous object or the like, user information, information on the electronic apparatus 80 (the illumination apparatus, the television, the air conditioner, or the like) which communicates with the communication unit 60 and the like are stored in the flash memory 50.

(Communication Unit 60) The communication unit 60 includes a wireless communication unit for communicating with the electronic apparatus 80 (the television 210, the air conditioner 220, the illumination apparatus 230, or the like), and transmits various control instructions to the electronic apparatus 80 in response to the user's gesture recognized by the gesture recognition unit 40. The communication unit includes a wireless module and an antenna. It is assumed that the antenna can perform rotation or tilt operation by an actuator, not shown. By making the antenna rotatable or tiltable, an approximate position of each electronic apparatus 80 can be recognized based on a radio field intensity from each electronic apparatus 80 received by the rotated or tilted antenna. When a new electronic apparatus 80 is placed in the living, for example, the position of the new electronic apparatus 80 can be recognized. Here, a plurality of antennae are provided instead of the rotation of the antenna, and the approximate position of each electronic apparatus 80 may be recognized based on radio field intensities of the antennae.

(CPU 70) The CPU 70 totally controls the electronic apparatus 80 in addition to the projection/apparatus control system 100. In the first embodiment, the CPU 70 performs the projection of the operation menu image, gesture recognition of the user to the operation menu image, and the control of the electronic apparatus 80 corresponding to the gesture.

The electronic apparatus 80 is the television 210, the air conditioner 220, the illumination apparatus 230, or the like, as illustrated in FIG. 1. Although each electronic apparatus 80 has various compositions, each electronic apparatus 80 includes a communication unit 81 for communicating with the communication unit 60, a CPU 82 that controls the electronic apparatus 80 in accordance with a communication result of the communication unit 81, and a controlled unit 83 that is controlled by the CPU 82. Suitable compositions for the communication unit 81, the CPU 82 and the controlled unit 83 are properly employed in accordance with each electronic apparatus 80 (the television 210, the air conditioner 220, or the illumination apparatus 230).

Figure 5:
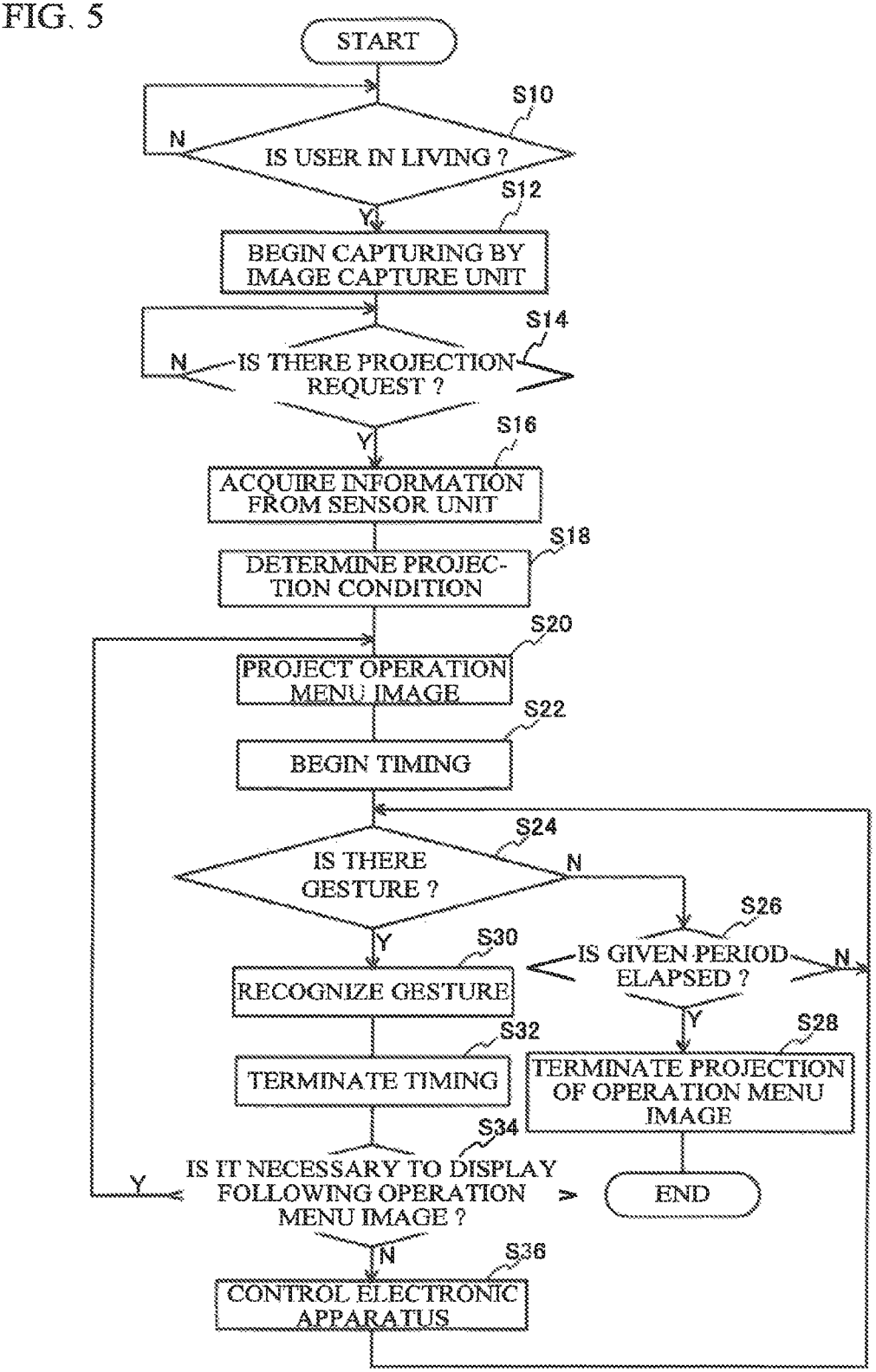
FIG. 5 is a flowchart illustrating the control of a CPU in the projection/apparatus control system according to the first embodiment.

Hereinafter, a detailed description will be given of the control by the CPU 70 in the projection/apparatus control system 100 configured as described above, according to a flowchart of FIG. 5. FIG. 5 illustrates the operation of each unit in the projection/apparatus control system 100 by the control of the CPU 70.

In step S10 of FIG. 5, the CPU 70 judges whether a user is in the living, based on the output of the temperature detection unit 31. When the judgment is YES, the process advances to step S12.

When the process advances to step S12, the CPU 70 controls the image capture unit 21 to begin capturing the user's image. Here, when the image capturing by the image capture unit 21 is the image capturing of the still image, the image capturing may be almost continuously performed while the user is continuing existing in the living, or the image capturing may be performed at predetermined intervals (2 to 3 seconds). On the other hand, when the operation menu image is projected by the projection unit 10, it is desirable that the image capturing is almost continuously performed or is performed by shortening the predetermined intervals. Similarly, in the case of the image capturing by the moving image, it is desirable to increase a frame rate when the operation menu is projected.

Next, in step S14, the CPU 70 judges whether there is a projection request of the operation menu image by the user. The CPU 70 transmits an instruction to the gesture recognition unit 40, and causes the gesture recognition unit 40 to recognize whether the user has performed a specific operation from the image captured by the image capture unit 21. Then, when the gesture recognition unit 40 recognizes the specific operation, the CPU 70 judges that there is the projection request. As described above, the operation of viewing the ceiling, the pointing operation, or a combination of their operations is considered as the specific operation.

At the same time as the judgment of step S14, the CPU 70 can confirm a user's position and a user's posture based on the image captured by the image capture unit 21. Here, the CPU 70 can confirm the user's posture from the size of the head in the captured image, as described above. In the first embodiment, it is assumed that the user sits on a chair and exists near the table.

When the judgment of step S14 is NO, i.e., there is no request from the user, the process of step S14 is repeatedly performed. When there is the request from the user, i.e., the judgment of step S14 is YES, the process advances to step S16.

When the process advances to step S16, the CPU 70 acquires information on the vicinity at which the user is located, from the sensor unit 30. In this case, the CPU 70 acquires the detection result of the temperature detection unit 31, and detects whether there is a domain with the temperature greater than 40 degrees near the table 200. Moreover, when there is a difference by comparing the reference image stored in the flash memory 50 with the image captured by the image capture unit 21, the CPU 70 judges whether there is a level difference in a portion with the comparison difference, i.e., there is a dish or the like on the table 200, from the detection result of the distance sensor 32. Further, the CPU 70 compares various images of the dangerous object stored in the flash memory 50 with the image captured by the image capture unit 21, and judges whether there is the dangerous object, such as a fork, a knife, a cutter knife, a pair of scissors or a kitchen knife, on the table 200.

Next, in step S18, the CPU 70 determines a projection condition of the operation menu image by the projection unit 10. In this case, the CPU 70 extracts a candidate of a domain on which the operation is projected, from the information detected in step S16. Here, the present embodiment is explained on the assumption that it is judged that there are not the dangerous object and the level difference near the table and the operation menu image can be displayed anywhere on the table.

Here, when there are a plurality of regions on which the operation menu can be displayed, the CPU 70 preferentially displays the operation menu image on a front region and a right region of the user. This is because the operation is easily performed by displaying the operation menu on the front and the right side of the user since many users are right-handedness. Here, when the gesture recognition unit 40 recognizes that the user often performs the operation with the left hand (the user is left-handedness), the CPU 70 may project the operation menu image on a left side of the user. Here, when it is recognized that the user is the left-handedness, the size of the head, the shoulder width and information indicating that the user is left-handedness are associated with each other for each user, and may be stored in the flash memory 50. In this case, the CPU 70 may judge whether the user in the image is the left-handedness, based on the size of the head and the shoulder width detected from the image captured by the image capture unit 21, and the information stored in the flash memory 50.

Here, a user's direction may be judged from the image captured by the image capture unit 21. When the user sits on the chair, a direction opposite to a backrest of the chair may be judged to be the front of the user. When the user is located near the television, a direction which is seen by the user and where the television exists may be judged as the user's direction since the user usually faces the television. Here, when the user is moving, the moving direction can also be judged as the user's direction.

Here, the projection image adjustment unit 15 adjusts the zoom lens of the projection optical system 14 so that the operation menu image 17 is projected on the table 200 in the size of about 150 mm×150 mm or about 100 mm×200 mm by default. In this case, a distance from the projection optical system 14 to a projection plane may be detected by the distance sensor 32.

Also, the projection image adjustment unit 15 adjusts the color of the operation menu image in accordance with a color signal from the imaging element in the image capture unit 21. In this case, by making an outer edge portion of the operation menu image into a dark color, the visibility of the operation menu image may be improved. Instead of this, when there are a plurality of candidates of domains on which the operation menu image is projected, the CPU 70 may determine a white domain (for example, a white table cloth) or a colorless domain (for example, a colorless carpet) as a projection domain in accordance with the color signal from the imaging element. Thereby, the visibility of the operation menu image can be improved.

The projection image adjustment unit 15 may improve the visibility of the operation menu by adjusting the luminance of the luminous source 11 in accordance with time and the illuminance of the illumination apparatus. Instead of this, an illuminometer is provided in living, and the luminance of the luminous source 11 and the illuminance of the illumination apparatus 230 may be adjusted in accordance with the detection result of the illuminometer. Contrary to this, when the operation menu image 17 is projected by the projection unit 10, the illumination of a portion on which the operation menu image is projected is made dark and hence the visibility of the operation menu image may be improved.

When there is the dangerous object or the level difference in the domain on which the operation menu image is projected, the projection image adjustment unit 15 adjusts the size of the operation menu image based on the position of the dangerous object or the level difference, and does not receive the magnification of the operation menu image. For example, in the case of FIG. 4B, the operation menu image is adjusted to avoid a pan 132 which is the dangerous object and a box 136 which forms the level difference, and a table cloth 134 (which is not the dangerous object and does not form the level difference) is not taken into consideration in the adjustment of the operation menu image.

After the process of step S18 of FIG. 5 is performed as described above, the process advances to step S20, and the CPU 70 outputs an instruction to the projection unit 10, based on the projection condition determined in step S18. Then, the projection unit 10 projects the operation menu image on the table 200 in accordance with the instruction. Here, it is assumed that the operation menu image (an initial menu image) of FIG. 3A is projected on the table 200 as an initial operation menu image. Moreover, in order to notify the user that the operation menu image is been projected, the CPU 70 may generates a sound such as "the operation menu image has is projected" by a speaker, not shown.

Next, in step S22, the CPU 70 begins timing to measure a time period when the projection unit 10 projects the operation menu image.

Next, in step S24, the CPU 70 judges whether there is the gesture by the user (the operation by the operation menu image). When this judgment is YES, the process advances to step S30, and when this judgment is NO, the process advances to step S26.

When the process has advanced to step S26, the CPU 70 judges whether a given period (a reception waiting time of the gesture (e.g. 10 seconds)) is elapsed after the operation menu image is projected (the timing is begun). When this judgment is NO, the process returns to step S24. On the contrary, when the judgment of step S26 is YES, i.e., when there is no gesture of the user for 10 seconds or more, the process advances to step S28. The CPU 70 judges that there is no will in which the user performs menu operation, and terminates the projection of the operation menu image. All the processes of FIG. 5 is terminated. Here, the reception waiting time of the gesture of step S26 is not limited to 10 seconds, and can be set freely.

On the other hand, when the gesture by the user (the operation by the operation menu image) is performed and the judgment of step S24 is YES, the CPU 70 outputs an instruction to the gesture recognition unit 40, and causes the gesture recognition unit 40 to recognize a gesture performed by the user in step S30. Here, since the operation menu image of FIG. 3A is projected by the projection unit 10 as described above, the gesture recognition unit 40 recognizes an icon of the operation menu image of FIG. 3A on which the user's finger (or a portion of body) is placed. When a state where the user's hand is placed on an icon of the television of FIG. 3A is captured by the image capture unit 21, for example, the gesture recognition unit 40 recognizes that the user selects the operation of the television. Here, the gesture recognition unit 40 should recognize that the user performs the gesture when the image capture unit 21 captures a predetermined number of images (2 to 5 images) about the finger on the same icon or the image about the finger on the same icon for a predetermined time (1 to 3 seconds).

Next, in step S32, the CPU 70 terminates the timing begun in step S22. Next, in step S34, the CPU 70 judges whether it is necessary to display a following operation menu image. Here, since now is a state where the television is selected from the initial menu image, the CPU 70 judges that it is necessary to display the following operation menu image, and the process returns to step S20. Then, the CPU 70 repeatedly performs the processes from step S20 to step S34 until the operation to the television is determined, and the process advances to step S36 when the operation to the television is determined (the judgment of step S34 is NO).

Then, in step S36, based on the operation of the television (e.g. the change of channel) selected from the operation menu image, the CPU 70 communicates an instruction of the operation with the communication unit 81 of the television 210 by using the communication unit 60. The CPU 82 of the television 210 controls the television 210 based on the instruction of the operation received by the communication unit 81.

Then, the process returns to step S24. When there is a user's gesture continuously, the CPU 70 performs a process in accordance with the gesture. When the process in accordance with the gesture is terminated (when the judgment of step S26 is YES), all the processes of FIG. 5 are terminated via step S28.

Figure 6:
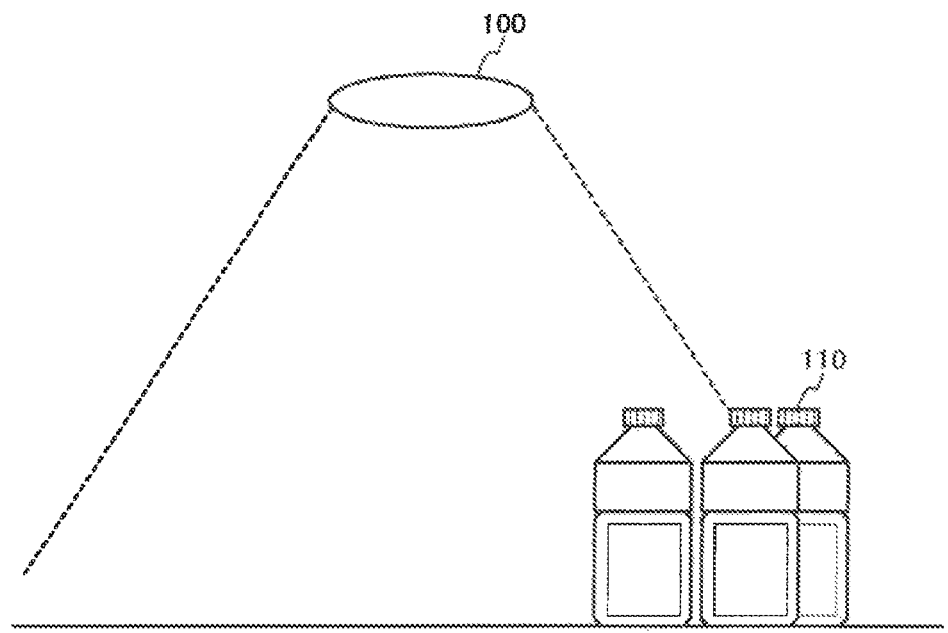
FIG. 6 is a diagram for explaining a determination method of a projection region when the image capture unit cannot capture the operation menu image.

Here, in above-mentioned step S18, the projection position of the operation menu image may be determined from a viewpoint of whether the image capture unit 21 can capture the projected operation menu image. FIG. 6 is a diagram illustrating a state where an object (bottle) 110 is placed on the table 200. In this case, since there is no object (bottle) 110 in the reference image (see FIG. 4A), the distance sensor 32 detects the distance to the object.

Here, it is assumed that domains on which the operation menu image can be projected exist at the right and left of the object (bottle) 110 in the case of FIG. 6. Here, when the operation menu image is projected on the right side of the object (bottle) 110, there is a case where the image capture unit 21 cannot capture the operation menu image depending on the position relationship between the image capture unit 21 and the object (bottle) 110 and the height of the object (bottle) 110 which are included in the projection/apparatus control system 100.

In such a case, the CPU 70 projects the operation menu image on a left domain of the object (bottle) 110 based on the position relationship between the image capture unit 21 and the object (bottle) 110. Here, when the height of the object is low and the image capture unit 21 can capture the operation menu image, the operation menu image may be projected on the right side of the object. In this case, the CPU 70 may judge whether the image capture unit 21 can capture the operation menu image depending on the height of the object from a surface of the table detected by the distance sensor 32, and a mounting position and the angle of view of the image capture unit 21. Actually, the projection unit 10 projects the operation menu image on the right side of the object, and the CPU 70 may find out whether the image capture unit 21 can capture the operation menu image. An actuator which drives the image capture unit 21 is beforehand provided in the image system unit 20, and when the image capture unit 21 cannot capture the operation menu image, the CPU 70 adjusts the position and the posture of the image capture unit 21 with the actuator and may find out whether the image capture unit 21 can capture the operation menu image.

Here, in next step S20, the CPU 70 may confirm whether the image capture unit 21 can capture the projected operation menu image. When the image capture unit 21 can capture the projected operation menu image, the process advances to next step S22. When the image capture unit 21 cannot capture a part (about 10-25%) of the projected operation menu image, the CPU 70 may adjust the projection position of the projection unit 10. When the image capture unit 21 cannot capture half or more of the operation menu image, for example, the process may return to step S18.

Here, although explanation is omitted in the flowchart of FIG. 5, it is assumed that, when the user operates an icon of magnification or reduction of the operation menu image 17, the projection image adjustment unit 15 changes the size of the operation menu image 17 in accordance with the user's operation.

As described above, according to the first embodiment, since the projection unit 10 projects the operation menu image 17 on the domain in accordance with the user's position, and the CPU 70 judges whether the operation menu image 17 can be projected on the domain in accordance with the user's position, the operation menu image 17 can be projected on a position suitable for the projection in accordance with the user's position. Thereby, the operation menu image becomes very convenient.

Moreover, in the first embodiment, since the CPU 70 judges whether the operation menu image 17 can be projected, based on the detection result of the temperature detection unit 31 for detecting the temperature (heat quantity) at a given domain in the living, the operation menu image can be prevented from being projected on the object with a high temperature. Thereby, the operation menu image can be projected on a safe position.

Moreover, in the first embodiment, since the CPU 70 judges whether the operation menu image 17 can be projected, based on the detection result of the distance sensor 32 for detecting the level difference in the domain, the operation menu image can be prevented from being projected on the domain having the level difference. Thereby, the operation menu image 17 can be projected on a convenient position.

Moreover, in the first embodiment, since the image comparison unit 22 detects existence or nonexistence of the dangerous object based on the image capturing result of the image capture unit 21, and the CPU 70 judges whether the operation menu image 17 can be projected, based on the detection result, the operation menu image can be prevented from being projected on the dangerous object. Thereby, the operation menu image can be projected on a safe position.

Moreover, in the first embodiment, since the projection image adjustment unit 15 adjusts the projection optical system 14 based on the image capturing result of the image capture unit 21, the operation menu image can be projected with an appropriate position, an appropriate size and an appropriate luminance.

Moreover, in the first embodiment, since the projection unit 10 projects the operation menu images of the plurality of electronic apparatuses 80, the plurality of electronic apparatuses 80 can be operated by using the operation menu images, respectively.

Moreover, in the first embodiment, the projection/apparatus control system 100 includes the communication unit 60 that can communicate with the plurality of electronic apparatuses 80, the menu display unit 16 detects the layout of the electronic apparatuses in accordance with communication states with the electronic apparatuses 80, and the operation menu image on which the layout is reflected is projected by the projection unit 10. Thereby, the layout of the electronic apparatuses 80 can be automatically detected in accordance with the communication states with the electronic apparatuses 80, and the operation menu image on which the layout is reflected is projected, so that usability of the projection/apparatus control system 100 can be improved.

Moreover, in the first embodiment, since the CPU 70 judges whether the image capture unit 21 can capture the operation menu image projected by the projection unit 10, the operation menu image can be projected at an appropriate position (a position where the user's operation (gesture) can be recognized).

Moreover, in the first embodiment, the CPU 70 detects whether there is an object which interrupts the image capturing of the operation menu image by the image capture unit 21, by using the distance sensor 32 and the image system unit 20 (the image comparison unit 22). Thereby, before the projection of the operation menu image, the domain where the image capture unit 21 can capture the operation menu image can be determined, and the operation menu image can be projected on the domain.

Moreover, in the first embodiment, the image capture unit 21 captures the user and a structure, such as the table 200 and the television 210, and the CPU 70 judges the user's direction based on the image capturing result of the table 200 and the television 210. Thereby, the user's direction can be judged without confirming a form of the user's body.

Moreover, in the first embodiment, since the image capture unit 21 captures the user from above the user, a user's privacy can be protected, and various control can be performed using the image capturing result of the image capture unit 21.

Moreover, in the first embodiment, since the CPU 70 detects the user's posture from the image capturing result of the image capture unit 21 which captures the user from above, and the projection unit 10 projects the operation menu image 17 near the user in accordance with the user's posture, the operation menu image 17 can be projected on the convenient position for the user. Moreover, in the first embodiment, since the projection unit 10 projects the operation menu image 17 of each of the electronic apparatuses 80 in accordance with the user's position, the operation menu image 17 of each of the electronic apparatuses 80 can be projected on the convenient position for the user.

Moreover, in the above-mentioned first embodiment, a description has been given of the case where the CPU 70 judges in step S14 that the user requests the projection of the operation menu image, based on the motion of the face and the hands. However, a method of the projection request is not limited to this. The CPU 70 may judge that there is the projection request when a specific sound is inputted to a microphone from the user.

Moreover, in the above-mentioned first embodiment, when a plurality of persons exist in the living, the operation menu image is displayed greatly so that the plurality of persons can operate the operation menu image. In this case, the operation menu image should be displayed on the front or right side of the person who has performed the projection request. All the persons may be able to operate the operation menu image, and only a specific person (the person who has performed the operation request) may be able to operate the operation menu image. When only the person who has performed the projection request can operate the operation menu image, the CPU 70 should judge whether a hand is a hand of the person who has performed the projection request, from a direction of the hand and a pointing direction. Here, in the first embodiment, operating the operation menu image by a child may be limited. In this case, the CPU 70 should judge whether the hand is a child's hand, from the size or the form of the hand.

Here, in the above-mentioned first embodiment, a description has been given of the case where the electronic apparatus 80 is an apparatus (the television 210, the air conditioner 220, the illumination apparatus 230, or the like) in the living. The electronic apparatus 80 is not limited to this. As long as the communication with the communication unit 60 is possible, the electronic apparatus 80 may be placed in a room different from the living. By doing so, the user can perform operation, such as turning off the illumination apparatus in a neighboring room while being in the living.

Here, in the above-mentioned first embodiment, a description has been given of the case where the projection/apparatus control system 100 is applied in the living. An applied place of the projection/apparatus control system 100 is not limited to this. The projection/apparatus control system 100 can be applied in a business space. For example, when the he projection/apparatus control system 100 is provided in a restaurant, a menu may be projected on a table at timing in which a visitor sits down or when there is a request by the gesture. Also, the goods which the visitor has selected may be registered into a POS system.

Here, in the above-mentioned first embodiment, a description has been given of the case where parts of the operation menu images of the respective electronic apparatuses 80 are common to each other, as illustrated in FIGS. 3B to 3D. The operation menu images are not limited to these. That is, the operation menu image of each electronic apparatus 80 may specialize in each electronic apparatus 80. For example, in the case of the operation menu of the television, a ten-key may be included in the operation menu image.

Second Embodiment

Next, a description will be given of a projection/apparatus control system 100' according to a second embodiment, based on FIGS. 7 to 10. The projection/apparatus control system 100' according to the second embodiment projects a menu image for supporting a user toward the user who uses a telephone, and controls an electronic apparatus based on the operation (gesture) to the menu image by the user.

Figure 7:
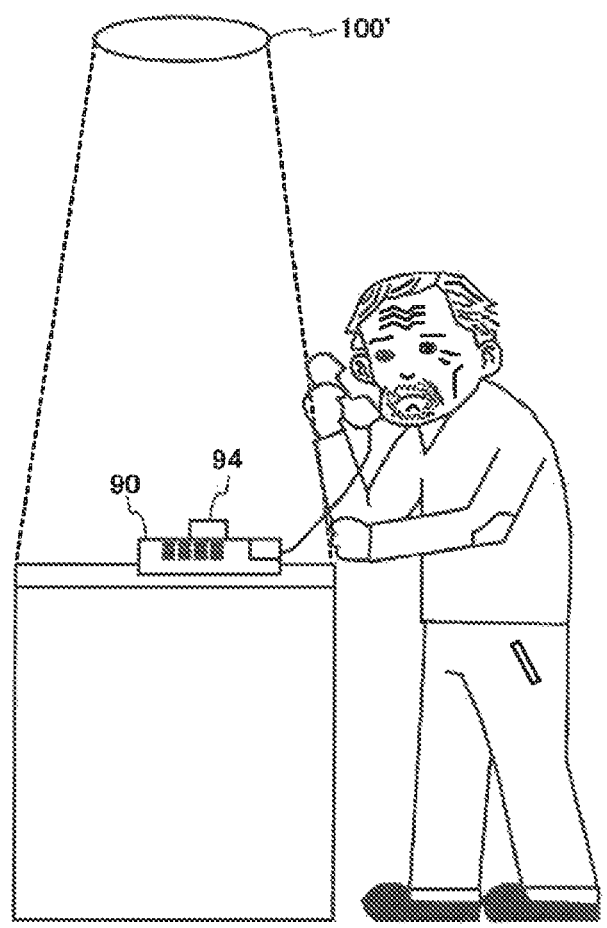
FIG. 7 is a diagram schematically illustrating a state of a place where the projection/apparatus control system according to a second embodiment is placed.

FIG. 7 is a diagram illustrating schematic composition of the projection/apparatus control system 100' according to the second embodiment. In addition to the projection/apparatus control system 100', a telephone 90 on which a face image capture unit is provided is illustrated in FIG. 7.

Figure 8:
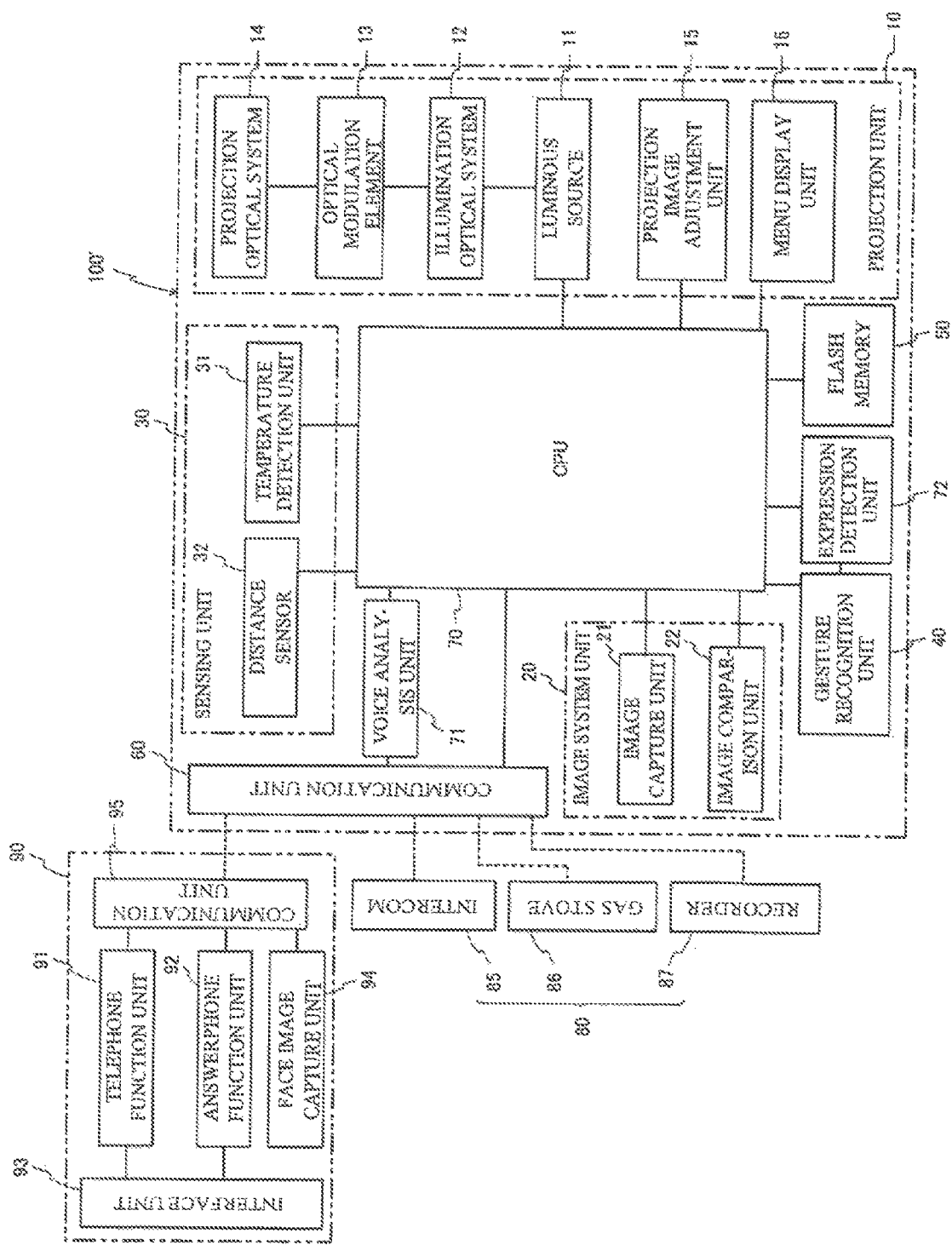
FIG. 8 is a block diagram illustrating the projection/apparatus control system according to the second embodiment, a telephone and an electronic apparatus.

FIG. 8 is a block diagram of the projection/apparatus control system 100' and the telephone 90. Hereinafter, a portion different from the projection/apparatus control system 100 (FIG. 2) according to the second embodiment is mainly explained. Here, elements identical with or similar to those of the block diagram of FIG. 2 are denoted by identical numerals, and description thereof is omitted.

As illustrated in FIG. 8, in the second embodiment, the telephone 90 can communicate with the projection/apparatus control system 100', and the projection/apparatus control system 100' includes a voice analysis unit 71 and an expression detection unit 72. The electronic apparatuses 80 which are control objects of the projection/apparatus control system 100' are an intercom 85, a gas stove 86, and a recorder 87.

(Telephone 90) The telephone 90 includes a telephone function unit 91, an answerphone function unit 92, an interface unit 93, a face image capture unit 94, and a communication unit 95.

The telephone function unit 91 realizes functions which a normal telephone should include, such as an outgoing/incoming function, a microphone/speaker function. In the second embodiment, a user's voice inputted to the microphone is transmitted to the projection/apparatus control system 100' via the communication unit 95.

The answerphone function unit 92 controls start and stop of the answerphone function, and includes a message function. When the user selects an icon of the answerphone function projected by the projection/apparatus control system 100' as described later, the answerphone function unit 92 shifts to the answerphone function even during the telephone conversation or transmits a message of refusal.

The interface unit 93 is an interface for performing voice input/output, LED turning-on and various displays in cooperation with various switches and buttons of the telephone 90.

The face image capture unit 94 is an image capture unit for capturing user's expression. In FIG. 7, the face image capture unit 94 is installed in the telephone so that it may be easy to capture the user's expression. However, a position of the face image capture unit 94 is not limited to this, and the face image capture unit 94 may be placed on a place other than the telephone as long as the position there of is a position where the user's expression can be captured. Further, a plurality of face image capture units 94 may be placed on the telephone.

The communication unit 95 can adopt various communication systems, such as a cable system or a radio system, and bi-directionally communicates with the communication unit 60 of the projection/apparatus control system 100'. The communication unit 95 transmits the user's voice inputted to the microphone of the telephone function unit 91 and the use's expression captured by the face image capture unit 94 to the projection/apparatus control system 100'.

(Voice Analysis Unit 71) The voice analysis unit 71 analyzes the user's voice to be inputted to the microphone of the telephone function unit 91. The voice analysis unit 71 includes a voice recognition dictionary, and classifies the inputted voice based on whether the inputted sound is an honorific language, a polite language, and a humble language, an everyday language (an ordinary language), or other casual diction. Here, in the present embodiment, the voice analysis unit 71 is provided in the projection/apparatus control system 100', but may be provided in the telephone 90.

(Expression Detection Unit 72) The expression detection unit 72 detects the user's expression captured by the face image capture unit 94, detects an expression which has wrinkles in a glabella and an expression which has narrowed eyes and is not smile, and judges whether the user is perplexed.

Here, the flash memory 50 is made to store an image which has the wrinkles in the glabella as the reference image, and the expression detection unit 72 can detect the wrinkles in the glabella by performing pattern matching of the reference image and the captured image. Moreover, the expression detection unit 72 may detect the wrinkles in the glabella from a shade distribution of a portion between a left eye and a right eye. Moreover, the detection of the wrinkles in the glabella is disclosed in also US Laid-open Patent Publication No. 2008-292148.

Moreover, the flash memory 50 is made to store average sizes of eyes captured by the face image capture unit 94, and the expression detection unit 72 can detect the expression which has the narrowed eyes by comparing the sizes of eyes captured by the face image capture unit 94 with the stored sizes of eyes.

Moreover, the expression detection unit 72 may detect a shrinkage amount of a facial muscle from the change of feature point coordinates of face elements in a user's moving image, and may judge whether the user is perplexed, as described in Japanese Laid-open Patent Publication No. 2002-258682.

(Electronic Apparatus 80) The intercom 85 can communicate with the projection/apparatus control system 100' by a communication unit, not shown. The intercom 85 has a function to generate a sound of a pseudo chime in accordance with an instruction of the CPU 70 in the projection/apparatus control system 100'.

The gas stove 86 can communicate with the projection/apparatus control system 100' by a communication unit, not shown. The gas stove 86 has a function to turn off a switch, not shown, and reduce a heating power in accordance with an instruction of the CPU 70 in the projection/apparatus control system 100'.

The recorder 87 can communicate with the projection/apparatus control system 100' by a communication unit, not shown. The recorder 87 has a function to record a program displayed in a TV screen in accordance with an instruction of the CPU 70 in the projection/apparatus control system 100'.

Figure 9A:
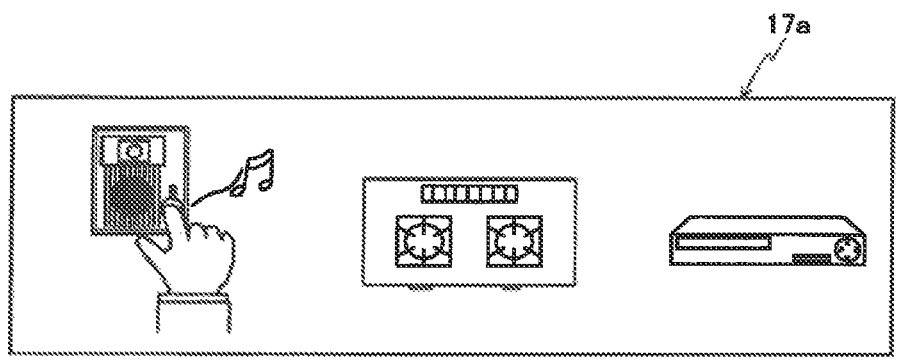
FIGS. 9A and 9B are diagrams illustrating examples of operation menu images according to the second embodiment.
Figure 9B:
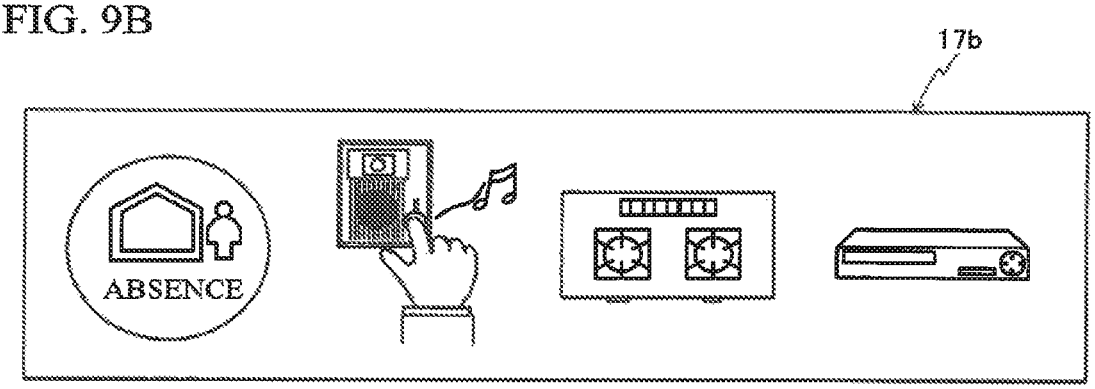

FIGS. 9A and 9B illustrate operation menu images 17a and 17b which the menu display unit 16 displays in the second embodiment, respectively. On the operation menu image 17a, icons of the intercom, the gas stove and the recorder are displayed. On the operation menu image 17b, an icon of the answerphone is displayed in addition to the icons of the intercom, the gas stove and the recorder. In the second embodiment, the menu display unit 16 projects any one of the operation menu images of FIGS. 9A and 9B via the projection optical system 14 in accordance with the user's diction.

Hereinafter, a detailed description will be given of the operation of each unit of FIG. 2 by the control of the CPU 70, according to a flowchart of FIG. 10. The flowchart of FIG. 10 is begun from a stage where the user has received a telephone call.

Figure 10:
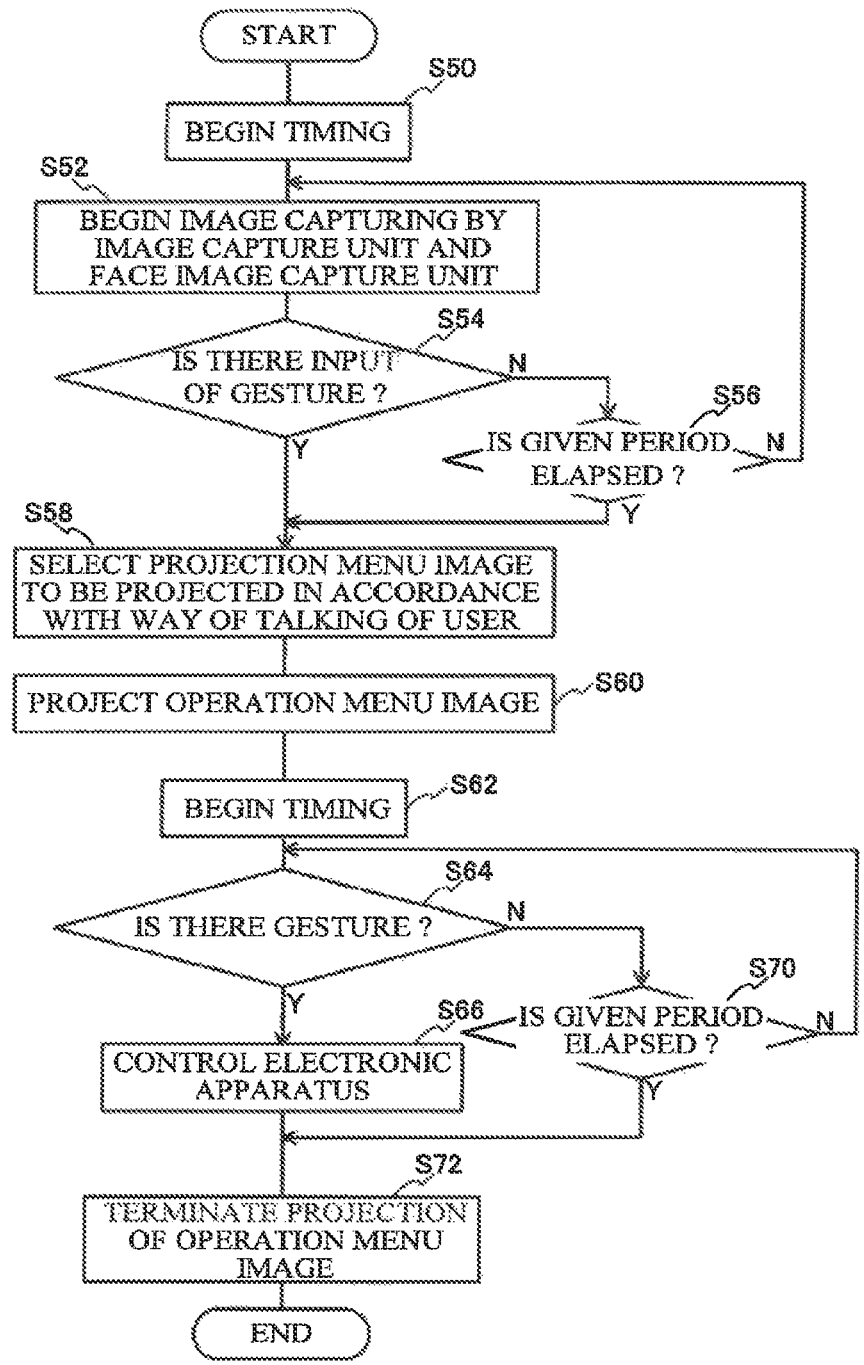
FIG. 10 is a flowchart illustrating the control of the CPU in the projection/apparatus control system according to the second embodiment.

In FIG. 10, the CPU 70 begins the timing for measuring a call duration in step S50. Next, in step S52, the CPU 70 causes the image capture unit 21 and the face image capture unit 94 to begin the image capturing. The image capture unit 21 captures a domain including the upper half of the body of the user who is using the telephone 90. The face image capture unit 94 captures the user's expression as described above. Here, the image captured by the face image capture unit 94 is transmitted to the expression detection unit 72. Then, the expression detection unit 72 detects the user's expression based on the captured image, and judges whether the user is perplexed.

Next, in step S54, the CPU 70 judges whether there is an input of the gesture from the user based on the image capturing result of step S52. Here, when the gesture recognition unit 40 recognizes that the user captured by the image capture unit 21 is performing a predetermined gesture intentionally, or the expression detection unit 72 judges that the user is perplexed, it is judged that there is the input of the gesture from the user. The gesture recognition unit 40 recognizes the user's gesture based on the reference image (it is assumed that the reference image is stored beforehand in the flash memory 50) of the gesture performed by the user when the received telephone call is a crank call. Here, gestures, such as lowering the thumb, turning a palm to the image capture unit 21 and making an X mark with both index fingers, are included in the gesture performed by the user when the received telephone call is the crank call.

When the judgment of step S54 is NO, the process advances to step S56, and the CPU 70 judges whether a given period (e.g. 10 minutes or more) for the timing begun in step S50 is elapsed. When the given period is elapsed, the process advances to step S58. When the given period is not elapsed, the process returns to step S52. Here, the reason why the process advances to step S58 when the given period is elapsed is that the user may not express the expression of annoyance though the user is perplexed by the crank call. Here, when the expression detection unit 72 detects a user's smile, the process may return to step S52 without advancing to step $58. The smile detection is disclosed in Japanese Patent No. 4,453,721 (Japanese Laid-open Patent Publication No. 2008-311817) or the like, for example.

On the other hand when the judgment of step S54 or S56 is YES (when there is the input of the gesture or the given period is elapsed), and the process advances to step S58, the CPU 70 selects the projection menu in accordance with the way of talking of the user.

For example, it is assumed that the voice analysis unit 71 analyzes the user's voice as the user being talking in the polite tone, such as "desu", "masu" and the like, or as the user using an honorific language, such as "ossyaru", "omochidesuka". In this case, the CPU 70 judges that the telephone call is a long telephone call (a crank call) from an older person, and selects the operation menu image 17a of FIG. 9A as a menu to be projected. On the contrary, it is assumed that the voice analysis unit 71 analyzes the user's voice as the user being not talking in the polite language (the user being talking in the everyday language (the ordinary language). In this case, the CPU 70 judges that the telephone call is a crank call, such as a telephone call for sales promotion, and selects the operation menu image 17b of FIG. 9B as the menu to be projected. Here, when the user is talking in casual language, the CPU 70 may select the operation menu image 17a of FIG. 9A, or may terminate all the processes of FIG. 10 by judging that the telephone call is a long telephone call with a friend.

Next, in step S60, the CPU 70 projects the operation menu image 17a or 17b near the telephone 90 based on the selection result of step S58. In this case, the CPU 70 should determine a projection domain based on the detection result of the sensor unit 30 and the image capturing result of the image capture unit 21, as with the first embodiment.

Next, in step S62, the CPU 70 begins the timing for measuring a period when the operation menu image 17a or 17b is projected.

Next, in step S64, the CPU 70 judges whether there is an input of the gesture of the user to the operation menu image projected in step S60. When this judgment is YES, the process advances to step S66. When this judgment is NO, the process advances to step S70.

When the process has advanced to step S70, the CPU. 70 judges whether a given period (e.g. 10 seconds) is elapsed. When the judgment is YES, the process advances to step S72. When the judgment is NO, the process returns to step S64. Also, when the process has advanced to step S72, the CPU 70 terminates the projection of the operation menu image, and terminates all the processes of FIG. 10.

On the other hand, when the judgment of step S64 is YES, and the process has advanced to step S66, the CPU 70 controls the intercom 85, the gas stove 86, the recorder 87 or the answerphone function unit 92 based on the input of the gesture of the user.

It is assumed that the user has touched the icon of the intercom in the operation menu image 17a or 17b when the user cannot come up with pretext to hang up. In this case, the CPU 70 outputs an instruction to the intercom 85 and causes the intercom 85 to ring the pseudo chime. Thereby, the user can hang up on the pretext of having to deal with the intercom 85.

It is assumed that the user has touched the icon of the answerphone when there is a telephone call for sales promotion. In this case, the CPU 70 forcibly turns on the answerphone function, and terminates the telephone call or reproduces the message of refusal. Thereby, the user can forcibly hang up the telephone call for sales promotion.

Moreover, it is assumed that the user has touched the icon of the gas stove or the recorder when the gas stove 86 is turned on or the user wants to watch a television program although the user wants to continue the telephone call. In this case, the CPU 70 turns off the gas stove 86 or begins recording the television program displayed on the television by the recorder 87. Thereby, the user can ensure the safety of the gas stove 86, or can record the program which the user is viewing and listening. Here, when the user has touched the icon of the gas stove or the recorder, detailed operation of the gas stove 86 or the recorder 87 may be achieved by displaying hierarchical menus, as described in the first embodiment.

In the way described above, when the process of step S66 is terminated, the process advances to step S72. In step S72, the CPU 70 terminates the projection of the operation menu image. Then, all the processes of FIG. 10 are terminated.

As described above in detail, according to the second embodiment, the projection/apparatus control system 100' includes: the face image capture unit 94 that can capture the user using the telephone 90; and the projection unit 10 that projects the operation menu image 17a or 17b of the electronic apparatus 80 different from the telephone 90 based on the projection result of the face image capture unit 94. Thereby, the operation menu image of the electronic apparatus 80 can be projected in proper timing based on the expression of the face of the user using the telephone 90, and hence the usability of the projection/apparatus control system 100' can be improved. The operation menu image can be projected in proper timing by performing the projection based on the expression of the face even if the user does not perform the given gesture. That is, since the user does not need to memorize the gesture, the usability of the projection/apparatus control system 100' can be improved also from this point.

Moreover, according to the second embodiment, since the voice analysis unit 71 detects information on the voice of the user using the telephone 90 and the projection unit 10 projects the operation menu image based on the analysis result of the voice analysis unit 71, a proper operation menu image can be projected based on the voice of the user using the telephone 90.

Moreover, according to the second embodiment, since the voice analysis unit 71 analyzes the diction of the user's voice, the proper operation menu image in accordance with the user's diction in the telephone can be projected.

Moreover, in the second embodiment, since the image capture unit 21 captures a state of the user's hand to the operation menu projected by the projection unit 10, and the CPU 70 controls the electronic apparatus 80 based on the image capturing result, the user on the telephone can operate the electronic apparatus 80 by moving the hand to the operation menu image.

Moreover, in the second embodiment, since the projection unit 10 terminates the projection of the operation menu image (NO in step S70) when the communication unit 60 does not communicate with the electronic apparatus 80 for a given period (the CPU 70 does not control the electronic apparatus 80) after the projection unit 10 projects the operation menu image, the occurrence of a situation where the operation menu image continues being projected for a long time can be controlled although the user does not use the operation menu image.

Moreover, in the second embodiment, the CPU 70 measures a period when the user uses the telephone 90, and the projection unit 10 projects the operation menu image based on the measured period (S56). Therefore, in the case of the long telephone call, the operation menu image can be projected in proper timing.

Moreover, in the second embodiment, since icons relating to the operation of the telephone 90 are included in the operation menu image (FIG. 9B), the user can operate the telephone 90 and the electronic apparatus 80 other than the telephone 90 in the operation menu image.

Moreover, in the second embodiment, since the projection unit 10 projects information on the telephone 90 and the electronic apparatus 80 in accordance with the state of the user using the telephone 90, the information in accordance with the state of the user (a perplexed state) can be provided.

Moreover, in the second embodiment, a recording and playback device which has recorded a baby's voice and a sound of a whistling kettle may be adopted as the electronic apparatus 80. Also in this case, the user operates the recording and playback device via the operation menu image in the case of the crank call, so that a pretext to hang up can be made.

Moreover, in the above-mentioned second embodiment, the description has been given of the case where the icons to be included in the operation menu image are predetermined as illustrated in FIGS. 9A and 9B. The icons to be included in the operation menu image are not limited to these. For example, only the apparatuses being used since before the user answers the telephone may be displayed. In this case, only the electronic apparatus 80 which can communicate with the communication unit 60 when the telephone 90 is used should be displayed For example, when the telephone 90 is used and the gas stove is not used, the icon of the gas stove may be removed from the menus of FIG. 9A and FIG. 9B.

Moreover, in the above-mentioned second embodiment, when the CPU 70 can acquire the contents of the conversation as the analysis result of the voice analysis unit 71, the CPU 70 may projects information based on the contents of the conversation via the projection unit 10. For example, the CPU 70 may summarize the contents of the conversation and project the summarized contents, or may project an image of a calendar when the contents about a date appear in conversation.

Moreover, in the above-mentioned second embodiment, the description has been given of a case where the operation menu image to be projected is selected based on the diction. However, the operation menu image to be projected may be selected based on the diction and an incoming call number.

Moreover, in the above-mentioned second embodiment, the description has been given of a case where the operation menu image of FIG. 9A or 9B is selected and projected in accordance with a situation, but a projection method of the operation menu image is not limited to this. For example, the operation menu image of FIG. 9A or 9B may be always projected.

Moreover, in the above-mentioned second embodiment, the description has been given of a case where an apparatus which the user uses is the telephone 90, as an example, but the apparatus which the user uses is not limited to this. For example, the apparatus which the user uses may be an intercom. In this case, when there is the sales promotion by the intercom 85, the operation menu image is projected. Thereby, a pseudo call of the telephone is generated by the operation which uses the operation menu image, for example, so that a pretext to refuse the sales promotion can be made.

Moreover, in the above-mentioned each embodiment, the description has been given of a case where the CPU 70 controls the electronic apparatus 80 based on the state of the hand to the operation menu image 17, 17a or 17b, but a control method of the electronic apparatus 80 is not limited to this. That is, the CPU 70 may control the electronic apparatus 80 based on the state of a part of the body (a foot, etc.; a part of the body includes clothes worn on the body) to the operation menu image 17, 17a or 17b.

The disclosures of all patent publication, international publication, US Laid-open patent Publication and US patent publication which are cited by the above-mentioned explanation are applied to the present specification, and become a part of description of the present specification.

While the exemplary embodiments of the present invention have been illustrated in detail, the present invention is not limited to the above-mentioned embodiments, and other embodiments, variations and modifications may be made without departing from the scope of the present invention.

What is claimed is:

1. A projection device comprising:
a projection unit that projects an image;
a first detection unit that detects an operation by a user on the image projected by the projection unit;
a transmission unit that transmits, to an electronic device, information based on the operation detected by the first detection unit; and
a second detection unit that detects whether the user is present within a predetermined space,
wherein the projection unit starts projection of the image after the user is detected by the second detection unit.

2. The projection device according to claim 1, wherein the first detection unit detects the operation at a first time interval,
the second detection unit detects the user at a second time interval, and
the first time interval is shorter than the second time interval.

3. The projection device according to claim 1, wherein projection of the image by the projection unit is ended when the first detection unit does not detect the operation for a predetermined period of time.

4. The projection device according to claim 1, further comprising:
an analyzing unit to which a voice of the user is input, the analyzing unit analyzing the voice, wherein
the projection unit changes the image according to an analysis result by the analyzing unit.

5. The projection device according to claim 1, wherein the projection device projects an operation menu for a plurality of electronic devices.

6. A method of transmitting information, comprising:
projecting an image;
detecting an operation by a user on the image projected;
transmitting, to an electronic device, information based on the operation detected; and
detecting whether the user is present within a predetermined space,
wherein the projecting includes starting projection of the image after the user is detected.

7. The method according to claim 6,
wherein the detecting of the operation includes detecting the operation at a first time interval,
wherein the detecting of whether the user is present within the predetermined space includes detecting the user at a second time interval,
wherein the first time interval is shorter than the second time interval.

8. The method according to claim 6, wherein the projecting includes ending projection of the image when the operation is not detected for a predetermined period of time.

9. The method according to claim 6, further comprising:
analyzing a voice of the user that is input,
wherein the projecting includes changing the image according to an analysis result in the analyzing.

10. The method according to claim 6, wherein the projecting includes projecting an operation menu for a plurality of electronic devices.

11. A projection device comprising:
a projection unit that projects an image;
a first detection unit that detects an operation by a user on the image projected by the projection unit; and
a transmission unit that transmits, to an electronic device, information based on the operation detected by the first detection unit,
wherein projection of the image by the projection unit is ended when the first detection unit does not detect the operation for a predetermined period of time.

12. A projection device comprising:
a projection unit that projects an image;
a first detection unit that detects an operation by a user on the image projected by the projection unit;
a transmission unit that transmits, to an electronic device, information based on the operation detected by the first detection unit; and
an analyzing unit to which a voice of the user is input, the analyzing unit analyzing the voice,
wherein the projection unit changes the image according to an analysis result by the analyzing unit.

13. The projection device according to claim 12, wherein the analyzing unit generates a summary based on the voice.

14. A projection device comprising:
a projection unit that projects an image;
a first detection unit that detects an operation by a user on the image projected by the projection unit; and
a transmission unit that transmits, to an electronic device, information based on the operation detected by the first detection unit,
wherein the projection device projects an operation menu for a plurality of electronic devices.

15. The projection device according to claim 14, wherein the projection device projects the operation menu to which a layout of the plurality of electronic devices is reflected.

* * * * *